Figure 1:
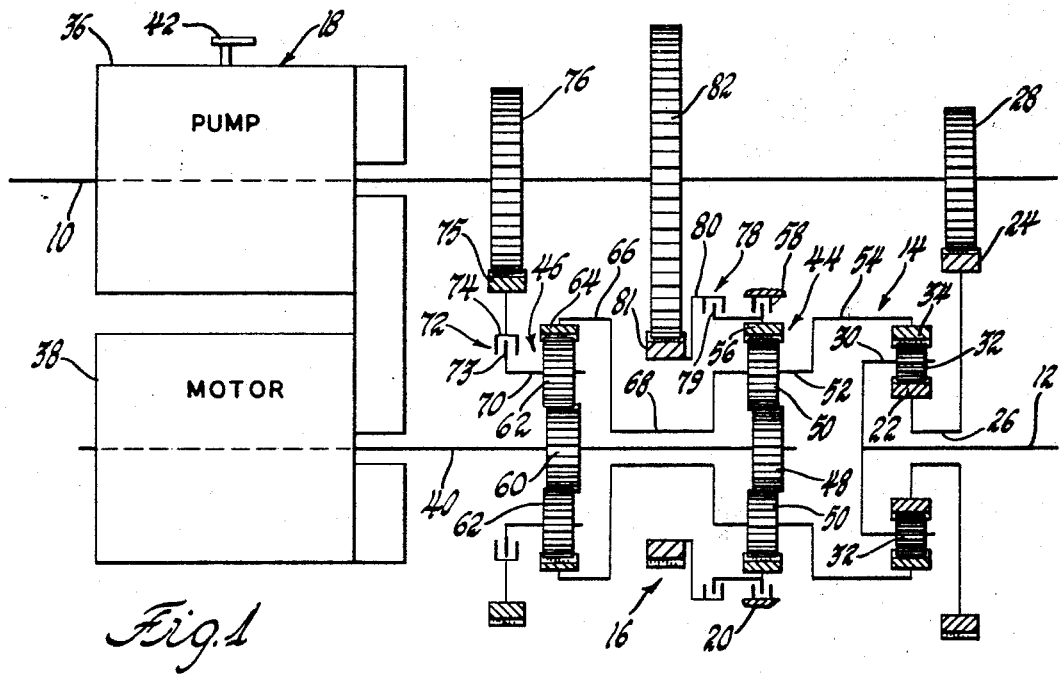

March 18, 1969   R. M. TUCK   3,433,095
SPLIT POWER TRANSMISSION
Filed Oct. 21, 1966

INVENTOR.
Robert M. Tuck
BY
Ronald L. Phillips
ATTORNEY

United States Patent Office
3,433,095
Patented Mar. 18, 1969

3,433,095
SPLIT POWER TRANSMISSION
Robert M. Tuck, Indianapolis, Ind., assignor to General Motors Corporation, Detroit, Mich., a corporation of Delaware
Filed Oct. 21, 1966, Ser. No. 588,608
U.S. Cl. 74—687                                       6 Claims
Int. Cl. F16h 47/04

This invention relates to transmissions and more particularly to split power transmissions providing a plurality of hydromechanical drives.

Division in a transmission of the power flow reduces the loading of the individual transmission components providing the power paths to enable use of smaller load capacity components. When an infinitely variable speed ratio drive such as provided by a hydrostatic unit is provided in one power path, further advantages are obtained in that it is possible with a simple control system to smoothly vary output speed while a constant transmission input speed is maintained. Furthermore, it is known that the hydraulic power transmitted can be reduced to zero to provide a full mechanical drive to increase operating efficiency at a predetermined output speed in each one of several drive ranges which are provided with the cooperation of range gearing. It is also known that speed synchronized drive establishment in the range gearing has been provided to reduce shift device wear and shift shock.

The principle of this invention lies in an output split power transmission having a final power combining unit receiving power in one power path directly from the transmission input and power in another power path from the input via a cooperating hydrostatic unit and multistep-ratio power combining unit to provide a plurality of split power drives extending drive ratio coverage. Each drive range provides an infinitely variable speed ratio and also full mechanical drive at a predetermined output speed and the multistep-ratio unit has a speed synchronized drive engaging device for establishing each drive range.

The invention is particularly useful in a heavy-duty vehicle such as a hauler type vehicle whose prime mover may be of the type which is best operated at a particular speed and torque condition such as a diesel engine and gas turbine. The transmission input shaft is directly connected to the pump of the hydrostatic unit and is connected by a gear train to the sun gear of a planetary gear set providing the transmission's final power combining unit. The pump has a controlled variable displacement and is hydraulically connected to a fixed displacement motor which is connected to drive the sun gears of a pair of planetary gear sets providing the multistep-ratio power combining unit. One of the step ratio gear sets is a multifunctional gear set and has its carrier connected to the ring gear of the final power combining gear set whose carrier is connected to the transmission output shaft. The ring gear of the multifunctional gear set is connected to a low-reverse drive brake. When the low-reverse brake is engaged, the transmission is conditioned to provide both a low drive range and a reverse drive range. Output speed in the low drive range is increased from zero speed by control of the hydrostatic pump to decrease the motor speed in the reverse direction from an idle speed to zero and then increase motor speed in the forward direction with full mechanical drive provided at zero motor speed. Alternatively, when the pump is controlled to drive the hydrostatic motor in reverse in a speed range above motor idle speed, the transmission output shaft is driven in the reverse direction in the reserve drive range and at a speed which increases with increasing motor speed in the reverse direction.

The ring gear of the other step ratio gear set is connected to the carrier of the multifunctional gear set and has its carrier drivingly connected to a drive train having an intermediate drive clutch to the transmission input shaft. Upon engagement of the intermediate drive clutch, whose driving and driven elements are speed synchronized at maximum motor speed in the forward direction in the low drive range, the ring gear of the final power combining gear set is then driven forwardly by the forward drive action of the hydrostatically and intermediate clutch driven gear set. The forward speed of the transmission output shaft in the intermediate drive range is increased by decreasing motor speed from its maximum forward speed to zero and then increasing motor speed in the reverse direction with full mechanical drive provided at zero motor speed.

The ring gear of the multifunctional gear set is drivingly connected by a drive train having a high drive clutch to the transmission input shaft. Upon engagement of the high drive clutch which is speed synchronized at maximum motor speed in the reverse direction in the intermediate drive range, the ring gear of the final power combining gear set is then driven forwardly by the hydrostatically and high clutch driven multifunctional gear set. Forward speed of the transmission output shaft is increased in the high drive range by decreasing motor speed from its maximum reverse speed to zero and then increasing motor speed in the forward direction with full mechanical drive provided at zero motor speed.

An object of the present invention is to provide a new and improved hydromechaniacl power train providing split power drive in a plurality of drive ranges with full mechanical drive in each drive range.

Another object of this invention is to provide a new and improved hydromechanical transmission providing hydromechanical drive in a plurality of drive ranges, full mechanical drive in each drive range and speed synchronized drive establishment for each drive range.

Another object is to provide a hydromechanical transmission providing output split power drive in three drive ranges with full mechanical drive in each drive range.

Another object is to provide a hydromechanical transmission providing output split power drive in three drive ranges with speed synchronized drive establishment for each drive range.

Another object is to provide a hydromechanical power train providing three output split power drives with full mechanical drive in each drive range and speed synchronized drive establishment for each drive range.

Another object is to provide a fixed speed ratio drive to a power combiner and a cooperating hydrostatic drive and three-step ratio drive to the power combiner.

Another object is to provide a plural power path transmission with one power path providing a fixed speed ratio drive to a power combiner and another power path having a three step ratio planetary gear unit cooperating with an infinitely variable hydrostatic unit to provide hydromechanical drives with speed synchronized drive establishment to the power combiner to afford three forward drive ranges and a reverse drive range with full mechanical drive in each forward drive range.

These and other objects of the present invention will be more apparent from the following description and drawing in which:

FIGURE 1 diagrammatically shows the preferred embodiment of the transmission.

Figure 2:
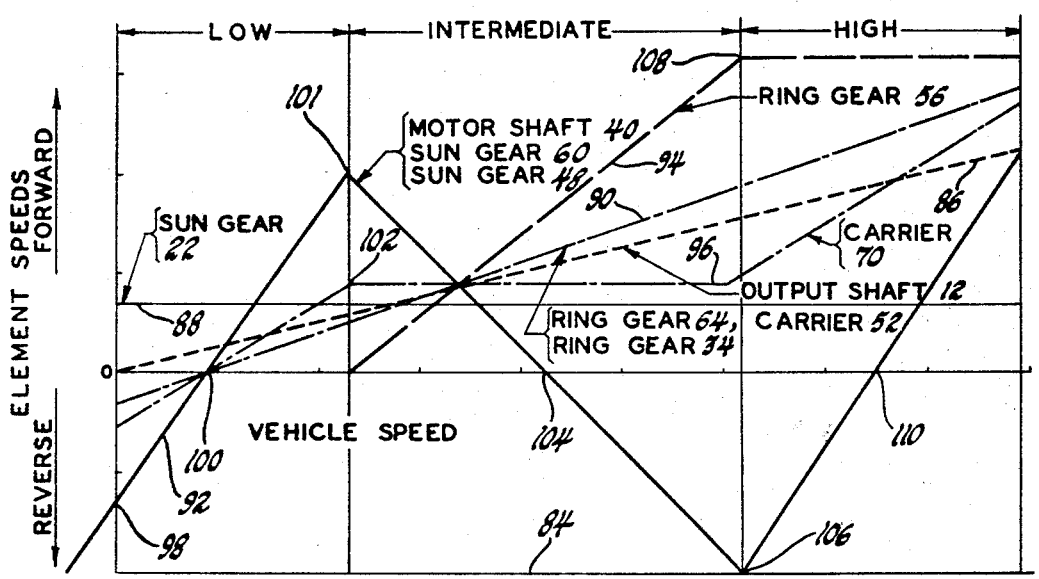

FIGURE 2 graphically shows typical speed characteristics of the transmission components.

The split power transmission of the present invention as shown in FIGURE 1 is particularly suited for use in heavy duty vehicles such as the hauler type and has an input shaft 10 which may be powered by any suitable prime mover such as a diesel engine or a gas turbine used in hauler type vehicles. An output shaft 12 is for delivering power to the vehicle's propelling devices which may be via a differential to the vehicle's driving wheels. Shafts 10 and 12 are operatively drive connected by a split power train comprising a final power combining or collecting planetary gear unit 14 connected to receive power directly from the input shaft and also connected to the input shaft by a cooperating three-speed and reverse step ratio planetary gear unit 16 and hydrostatic unit 18. The transmission components are supported by and housed within a transmission housing generally designated at 20 with the axes of shaft 10 and 12 located parallel each other to provide a compact arrangement which will be more clear from the following description.

The final power combining unit 14 is concentric with the output shaft 12 and has an input sun gear 22 connected to an annular spur gear 24 by a hub 26 rotatable about output shaft 12. Gear 24 meshes with a spur gear 28 connected to input shaft 10 so that sun gear 22 is continuously driven by the input shaft in what will be described as the forward direction with the fixed speed ratio mechanical drive. Carrier 30 is the output element of the final power combining unit and is connected to output shaft 12. Carrier 30 has pinions 32 meshing with sun gear 22 and ring gear 34 which is the other input member of the final power combining unit.

The input shaft 10 is drivingly connected to the final power combining input ring gear 34 by joint action of hydrostatic unit 18 and multistep-ratio unit 16 to selectively provide a full hydraulic power path and hydromechanical power paths thereto in parallel with the full mechanical power path to the final power combining sun gear 22. Input shaft 10 is connected to the pump 36 of the hydrostatic unit which pump is concentric with the input shaft and hydraulically connected to the hydrostatic motor 38. The hydrostatic unit is of conventional design with the pump having an infinitely variable displacement and the motor having a fixed displacement, the speed and direction of the motor shaft 40 being controlled by a pump displacement control mechanism operated by a control 42. Motor shaft 40 is located inboard of and coaxial with the output shaft. It will be understood that with the variable displacement pump 36, the motor speed from zero to a maximum forward speed and a maximum reverse speed is obtained with constant power output on controlling the displacement of the pump by control 42 assuming pump input speed remains constant.

The multistep-ratio unit 16 comprises a multifunctional planetary gear set 44 and an intermediate drive planetary gear set 46. In gear set 44, the input sun gear 48 is connected to motor shaft 40 and meshes with a plurality of pinions 50 journaled on carrier 52, motor shaft 40 being coaxial with output shaft 12. Output carrier 52 is connected by a drum 54 to the final power combining input ring gear 34. Ring gear 56 meshes with pinions 50 and is braked on engagement of a grounded low-reverse brake 58 to condition the transmission for both a reverse drive range and a low drive range.

In gear set 46, the input sun gear 60 is connected to motor shaft 40 and meshes with a plurality of pinions 62. Pinions 62 mesh with an output ring gear 64 which is connected to a drum 66. Drum 66 is connected to output carrier 52 by a sleeve shaft 68 freely surrounding motor shaft 40. The input carrier 70 on which the pinions 62 are journaled is mechanically driven by input shaft 10 through an intermediate drive train upon engagement of an intermediate drive clutch 72 provided in the drive train and located concentric with motor shaft 40. The intermediate clutch driven member 73 is directly connected to carrier 70. The driving clutch member 74 is connected to an annular spur gear 75 freely rotatable about and concentric with motor shaft 40. Gear 75 is in mesh with a spur gear 76 connected to input shaft 10.

The input ring gear 56 of gear set 44 may also be mechanically driven by the input shaft through a high drive train upon engagement of a high drive clutch 78 provided in the high drive train and located concentric with motor shaft 40. The high clutch driven member 79 is directly connected to ring gear 56 and the driving clutch member 80 is connected to an annular spur gear 81 freely rotatable about and concentric with sleeve shaft 68. Gear 81 is in mesh with a spur gear 82 connected to input shaft 10.

FIGURE 2 shows typical speed characteristics of the transmission's elements when the input shaft speed as indicated by curve 84 is maintained constant throughout all the drive ranges while the output shaft speed as indicated by curve 86 is being increased. The graph shows the element speeds in the forward and reverse directions plotted along the ordinate and vehicle speed plotted along the abscissa recognizing that the slope of the output shaft speed curve is determined by the speed ratio between the transmission output shaft and the driving vehicle wheels at their contact with the road surface. The speed of sun gear 22 is indicated by curve 88 and is a constant speed which is determined by the reduction ratio of meshing gears 28 and 24. The speed of ring gear 34, carrier 52 and ring gear 64 is indicated by curve 90 and the speed of motor shaft 40 and sun gears 48 and 60 is indicated by curve 92. The speeds of ring gear 56 and carrier 70 are indicated by curves 94 and 96, respectively.

Describing now the operation of the transmission and the provision of speed synchronized shifting and full mechanical drive, neutral is established by disengaging all the drive establishing devices to prevent power delivery from units 16 and 18 to ring gear 34 of the final power combining unit and thus to the output shaft while the sun gear 22 of the then passive final power combining unit is driven mechanically. When it is desired to shift from neutral to either the low or reverse drive range, the pump control 42 is controlled by the vehicle operator to operate the motor at a predetermined idle speed so that upon engagment of the low-reverse brake 58 the final power combining ring gear 34 has a reverse speed component which offsets or balances the forward speed component of the mechanically driven sun gear 22 of unit 14 to provide zero output shaft speed in the low and reverse drive ranges. The motor idle speed is where the motor speed curve 90 intersects the ordinate and corresponds to zero vehicle speed as indicated at point 98. The motor idle speed which is in the reverse direction is determined by the reduction ratio of gear set 44 with brake 58 engaged and the reduction ratio between input shaft 10 and ring gear 34 of unit 14 assuming carrier 30 of unit 14 provides reaction. In other words, with brake 58 engaged and motor shaft 40 rotating in the reverse direction the ring gear 34 will be driven by motor shaft 40 in the reverse direction at a reduced speed determined by the reduction ratio provided by gear set 44. The motor speed is determined so that ring gear 34 is driven in the reverse direction at the speed it would be driven by the mechanical drive train to the sun gear 22 if carrier 30 were positively held.

With brake 58 engaged the gear set 44 is conditioned for its carrier 52 to drive ring gear 34 and the hydrostatic pump 36 may be controlled to provide the low drive range by reducing the reverse speed of the hydrostatic motor and connected sun gear 48 along curve 92 to reduce the subtracting reverse speed component of the final power combining ring gear 34 and correspondingly increase the output shaft speed along curve 86 while the forward speed component of the sun gear 22 remains constant along curve 88. Alternatively, control of the hydrostatic pump to increase reverse motor speed above idle speed provides the reverse drive range. In the low drive range, when the motor speed and thus the speed of sun gear 48 reaches zero speed, increased output shaft speed is thereafter provided by controlling the hydrostatic pump to drive the motor shaft in the forward direction to provide the final power combining ring gear 34 with a forward speed component which adds to the forward speed component of sun gear 22 with maximum output shaft speed being reached in the low drive range when maximum forward motor speed is reached. At the point 100 where the motor speed is zero, which corresponds to an intermediate output shaft and vehicle speed, the hydraulic power transmitted is zero to provide an efficient full mechanical drive. The ratios of the planetary gear sets 44 and 46 and the gear ratio of the intermediate drive gear train 75, 76 are determined so that when the motor reaches its maximum forward speed in the low drive range as indicated at point 101, the driven clutch member 73 of the intermediate drive clutch 72 is driven by gear sets 44 and 46 at the same speed and in the same direction as the driving clutch member 74 is driven by input shaft 10 through gear train 75, 76. The intermediate clutch synchronous speed corresponds to the speed of carrier 70 as indicated at point 102.

The shift from low to the intermediate drive range is accomplished when the above speed synchronized condition of the intermediate clutch 72 is reached in the low drive range. The low drive establishing brake 58 is released and gear set 44 becomes passive since it has no reaction and the intermediate drive establishing clutch 72 is engaged to activate gear set 46 for power collection and transmittal. The intermediate mechanical drive and the hydrostatic drive are thus combined by gear set 46 with the hydrostatic motor providing a forward speed component for sun gear 60 and the mechanical drive providing a constant forward speed component for carrier 70 which former component subtracts from the latter component to drive the final power combining ring gear 34 in the forward drive direction at the same speed that existed at maximum low drive range speed. In the intermediate drive range the output shaft speed is increased by decreasing motor speed from its maximum forward speed to reduce the subtracting speed component of sun gear 60 to correspondingly increase the forward speed component of the final power combining ring gear 34. When motor speed reaches zero as indicated at point 104 the drive is all mechanical to the final power combining unit for increased operating efficiency at an intermediate output shaft and vehicle speed in this drive range. Thereafter the output shaft speed is increased by increasing the motor speed in the reverse direction to provide sun gear 60 with an increasing reverse speed component which adds to the constant forward speed component of carrier 70 to increase the forward speed component of the final power combining ring gear 34. Output shaft speed continues to increase with increasing reverse speed of the motor until maximum reverse motor speed is reached as indicated at point 106. The ratios of gear sets 44 and 46 and the gear ratio of the mechanical high drive gear train 81, 82 are determined so that when the motor reaches its maximum reverse speed in the intermediate drive range, the driving and driven members 80 and 79 of the high clutch 78 are driven at the same speed and in the same direction. The high clutch synchronous speed corresponds to the speed of ring gear 56 as indicated at point 108.

The shift from intermediate to the high drive range is accomplished when the above synchronous condition of the high clutch 78 is reached in the intermediate drive range. The intermediate drive establishing clutch 72 is disengaged and the intermediate drive clutch 78 is engaged and the gear set 46 becomes passive since it has no reaction. The high mechanical drive and the hydrostatic drive are then combined in the gear set 44. The motor drive sun gear 48 subtracts from the forward speed component of ring gear 56 to maintain the same output shaft speed that existed at maximum intermediate drive range speed. Output shaft speed in the high drive range is increased by decreasing the reverse speed of the motor to decrease the subtracting speed component of sun gear 48 to increase the contribution of the constant forward speed component of ring gear 56 to correspondingly increase the speed of the final power combining ring gear 34 and the output shaft. When motor speed in the high drive range reaches zero as indicated at point 110 there is provided full mechanical drive to the final power combining unit for increased transmission operating efficiency in the high drive range at an intermediate output shaft and vehicle speed. Output shaft speed is thereafter increased by driving the motor in the forward direction so that there is an additive speed component provided to sun gear 48 to increase the forward speed of ring gear 34 and correspondingly the speed of output shaft 12.

The speed synchronized condition of the drive establishing devices occurs both before and after an upshift while the motor speed is held at its maximum speed in either the forward or reverse direction depending on the drive range. Thus, the intermediate drive clutch 72 is speed synchronized for a downshift from high to the intermediate drive range at maximum motor speed in the reverse direction and the low drive establishing brake 58 is speed synchronized for a downshift from intermediate to the low drive range at maximum motor speed in the forward drive direction.

Thus, the speeds of the low, intermediate and high drive establishing devices are speed synchronized for both upshifts and downshifts and provide smooth power transition with no abrupt ratio change, clutch or brake slippage nor shift shock. In addition, the arrangement of the transmission components avoids abrupt changes in operating stroke and/or speed and direction of rotation of the hydrostatic unit during all shifts. Furthermore, a full mechanical drive is provided in each drive range for optimum transmission operating efficiency. Furthermore, the hydrostatic unit allows the prime mover which is driving the input shaft 10 to operate at its optimum speed and torque condition which is particularly desirable for diesel engines and also permits the use of a constant engine speed which is a requirement of certain types of gas turbine engines.

The above described embodiment is illustrative of the invention which may be modified within the scope of the appended claims.

I claim:

1. In a transmission the combination of input means; output means; power combining means operatively drive connected to said output means operable to drive said output means with plural power input drives; fixed speed ratio drive means operatively drive connecting said input means and said power combining means to provide a continuous fixed speed ratio input drive to said power combining means; infinitely variable speed ratio drive means connected to be driven by said input means; and multistep-ratio drive means having one input drive from said input means and another separate input drive from said infinitely variable speed ratio drive means for providing another input drive to said power combining means whereby said fixed speed ratio drive means, said infinitely variable speed ratio drive means and said multistep-ratio drive means cooperatively provide a plurality of split power drives between said input and output means.

2. The transmission set forth in claim 1 and said infinitely variable speed ratio drive means comprising hydrostatic drive means.

3. The transmission set forth in claim 1 and said multistep-ratio drive means including synchronous drive establishing means operable to establish and disestablish stepped speed ratio drives under synchronous speed conditions at a predetermined output speed of said infinitely variable speed ratio drive means.

4. The transmission set forth in claim 1 and said multistep-ratio drive means comprising a pair of planetary gear sets each having a pair of input elements and an output element one input element of each gear set operatively drive connected to said motor, the output element of one gear set operatively drive connected to said power combining means, drive means including a clutch for operatively drive connecting said input means to the other input element of said one gear set, the output element of the other gear set operatively drive connected to the output element of said one gear set, drive means including a clutch for operatively drive connecting said input means to the other input element of said other gear set.

5. The transmission set forth in claim 1 and said infinitely variable speed drive means comprising hydrostatic drive means having a pump connected to said input means and a motor; said multistep-ratio drive means comprising a pair of planetary gear sets each having a sun gear, a ring gear and a carrier having a pinion meshing with said sun and ring gear, both of said sun gears connected to said motor, the carrier of one gear set connected to said power combining means, a brake for braking the ring gear of said one gear set to establish both a low and a reverse drive range, a high drive train including a clutch for drivingly connecting said input means to the ring gear of said one gear set to establish a high drive range, the ring gear of the other gear set connected to the carrier of said one gear set, an intermediate drive train including a clutch for drivingly connecting said input means to the carrier of said other gear set to establish an intermediate drive range.

6. The transmission set forth in claim 5 and said power combining means including a planetary gear set having a sun gear, a ring gear and a carrier having a pinion meshing with said sun and ring gear, said sun gear connected to said input means, said ring gear connected to the carrier of said one gear set, said carrier connected to said output means.

References Cited

UNITED STATES PATENTS

| | | | |
|---|---|---|---|
| 1,727,232 | 9/1929 | Farrell | 74—689 |
| 2,372,226 | 3/1945 | Robin et al. | 74—681 |
| 2,851,906 | 9/1958 | Delorean | 74—682 X |
| 3,355,967 | 12/1967 | Moan | 74—688 |

FOREIGN PATENTS

| | | |
|---|---|---|
| 96,747 | 1/1961 | Netherlands. |
| 1,113,621 | 9/1961 | Germany. |
| 967,328 | 8/1964 | Great Britain. |
| 1,185,883 | 1/1965 | Germany. |
| 49,057 | 3/1965 | Poland. |

ARTHUR T. McKEON, *Primary Examiner.*

U.S. Cl. X.R.

24—221; 85—5; 339—17, 255